3,102,874
**DIGLYCIDYL ETHERS OF 2,2,2-TRICHLORO-
ETHYLIDENE BISPHENOLS**
Bart J. Bremmer, Midland, Mich., assignor to The Dow
Chemical Company, Midland, Mich., a corporation of
Delaware
No Drawing. Filed July 15, 1960, Ser. No. 43,005
5 Claims. (Cl. 260—47)

This invention relates to new epoxy resins consisting essentially of the diglycidyl ethers of 2,2,2-trichloroethylidene bisphenols and a process for preparing the same.

A wide range of epoxy resin compositions have been prepared by the addition polymerization of epichlorohydrin and 4,4'-bis-(p-hydroxyphenol) propane (Bisphenol "A") in the presence of an alkaline catalyst. These epoxy resin compositions have been in commercial use for a considerable period of time. The lower molecular weight epoxy liquid resins find use in lamination, casting, and potting applications.

The new epoxy resins of the invention are prepared by the reaction of epichlorohydrin and a bisphenol having the general formula:

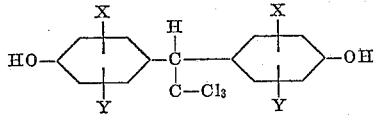

wherein "X" and "Y" each represent a member of the group consisting of hydrogen and lower alkyl radicals containing from 1 to 4 carbon atoms.

It is an object of this invention to provide new epoxy resins.

A further object is to provide a process for the preparation of the new epoxy resins.

The bisphenol starting materials can be prepared by reaction of phenol or an alkyl phenol such as ortho-, meta-, and para-substituted ethyl-, propyl-, and butyl-phenols or ortho- and metacresols with chloral or chloral-hydrate in the presence of a condensation catalyst. Examples of suitable bisphenol starting materials are the 4,4'-, 2,4'-, and 2,2'-isomers of (2,2,2-trichloroethylidene) diphenol; the 4,4'-, 2,4', and 2,2'-isomers of (2,2,2-trichloroethylidene) di-ortho-cresol; the 4,4'-, 2,4'-, and 2,2'-isomers of (2,2,2-trichloroethylidene) di-meta-cresol; and the ethyl, propyl, or butyl substituted bisphenols of chloral with similarly substituted alkyl radicals occupying in turn the 2, 3, 5, and 6 positions on the benzene ring.

The new epoxy resins are prepared by reaction of one or a mixture of two or more of the bisphenols with epichlorohydrin in the presence of an alkali e.g. sodium hydroxide or potassium hydroxide, dissolved in a solvent such as water. The bisphenol is dissolved in an excess of epichlorohydrin in proportions corresponding to from 4 to 20 gram moles or more per gram mole of the bisphenol. The epichlorohydrin is reacted with the bisphenol in amounts corresponding to at least 2 gram moles of the epichlorohydrin per gram mole of the bisphenol. The reaction can be carried out at temperatures of from 80° C. to 115° C. at subatmospheric or substantially atmospheric pressures. Temperatures and pressures should be maintained to permit continuous distillation of water from the reaction mixture. The concentration of water should not exceed 5 percent by weight based on the weight of the reactants.

In practice, the bisphenol and epichlorohydrin reactants are placed in a suitable reaction vessel. The mixture is stirred and heated to temperatures between 80 and 115° C., and an alkali, suitably an alkali metal hydroxide in the form of a concentrated aqueous solution, is added slowly while removing water from the reaction mixture at a rate such that the concentration of water therein is maintained below 5, preferably below 2 percent, by weight. The water is removed by azeotropic distillation with epichlorohydrin. The water is separated from the organic liquid and the organic liquid is returned to the reaction. The alkali is employed in amount substantially chemically equivalent to the bisphenol used.

When all of the alkali solution has been added, the unreacted epichlorohydrin is distilled off by heating the mixture up to a temperature of about 168° C. and under 80 mm. absolute pressure. The residue is diluted with an approximate equal weight of a solvent. The mixture is filtered to remove insoluble material. The product is recovered by heating the filtrate to distill and remove the solvent.

The new epoxy resins are light amber, viscous, liquid materials having a Gardner color range of from 10–16 and have epoxide equivalent weights between 240 and 290.

EXAMPLE I

*Condensation of Chloral and Phenol*

147.4 grams (1 mole) of chloral, 188 grams (2 moles) of phenol, 390 grams (5 moles) of benzene, and 8.6 grams of an acid catalyst, consisting of a mixture of 31.7 grams of dried diatomaceous earth impregnated with 163 grams of concentrated sulfuric acid, were combined in a 1-liter flask fitted with a stirrer, a thermometer, a reflux condenser, and a water trap. The reaction mixture was heated at reflux temperatures of from 82–89° C. in a nitrogen atmosphere for 7 hours while removing the water condensate. When approximately 18 cc. of water had been removed, a product crystallized from the reaction mixture. The crystals were filtered out and dissolved in 1 liter of ethanol. Removal of the catalyst was accomplished by filtering it from the ethanol solution. The addition of 2 liters of distilled water aided the precipitation of a crystalline product which was isolated by filtration from the ethanol-water solvent mixture. The dried crystalline product consisting of 4,4'-(2,2,2-trichloroethylidene) diphenol, weighed 181.2 grams representing a yield of 56.2 percent by weight, as based on the weight of chloral or phenol initially used. The color of the crystals was off-white and had a melting point range of from 185° C. to 188° C.

EXAMPLE II

The epoxylation of the crystalline 4,4'-(2,2,2-trichloroethylidene) diphenol, prepared in accordance with the procedure set forth in Example I was conducted as follows:

460 grams (5 moles) of epichlorohydrin were added to 158.7 grams (0.5 mole) of 4,4'-(2,2,2-trichloroethylidene) diphenol. The resulting mixture was heated to about 104° C. The slow addition of 83.2 grams (1.04 moles) of an aqueous 50 weight percent solution of sodium hydroxide was begun through a dropping funnel. Refluxing started when a sufficient amount of sodium hydroxide solution had been added, corresponding to approximately 1 percent by weight of water in the reaction flask. Sodium hydroxide was added at a rate, such that the amount of water azeotroped off with the epichlorohydrin was about equal to the water added with the hydroxide plus the water formed in the reaction. This was controlled by keeping the reaction temperature at 104° C.±1° C. The water-epichlorohydrin mixture which azeotroped off was separated in the water trap and the epichlorohydrin returned to the reaction flask. All of the sodium hydroxide solution was added to the reaction mixture over a period of about 1 hour and the reaction was terminated. Unreacted epichlorohydrin was distilled off at a temperature of about 168° C. and an absolute pressure of 80 mm. 250 ml. of toluene were added to the residue. The salt was filtered out. The filter cake was washed with acetone and the acetone filtrate was added to the toluene solution. The acetone and toluene were distilled off at a temperature of about 165° C. and an absolute pressure of 80 mm. There was obtained 195 grams of an epoxy resin product, consisting of the diglycidyl ether of 4,4'-(2,2,2-trichloroethylidene) diphenol. The yield of said product was 50.7 weight percent, as based on the weight of the chloral initially used. The product has an epoxy equivalent weight of 249 and a Gardner color of 11–12.

EXAMPLE III

PART A 147.4 grams (1 mole) of chloral, 188 grams (2 moles) of phenol, 390 grams (5 moles) of benzene, and 8.6 grams of the acid catalyst as described in Example I, were combined in a 1-liter flask equipped with a means of stirring, a thermometer, a reflux condenser, and a water trap. The reaction mixture was heated at reflux temperatures of from 82–89° C. in a nitrogen atmosphere for 7 hours while removing the water condensate. When approximately 18 cc. of water had been removed, the reaction mixture was cooled. Crystals separated from the reaction medium and were collected by filtration. The yield of the crystalline product, consisting essentially of 4,4'-(2,2,2-trichloroethylidene) diphenol, was 60.8 percent by weight.

The filtrate remaining after separating the crystalline product from the reaction mixture was a benzene solution of bisphenols consisting principally of the isomers 2,4'-(2,2,2-trichloroethylidene) diphenol, 2,2'-(2,2,2-trichloroethylidene) diphenol, and a small amount of 4,4'-(2,2,2-trichloroethylidene) diphenol.

The benzene portion was distilled off in sufficient quantity to leave a slurry of the isomers.

PART B 333 grams of epichlorohydrin were added to the slurry of isomers prepared in Part A above with stirring. 7.5 grams of sodium hydroxide in 10 grams of water was added by means of a dropping funnel to the slurry. The reaction mixture was heated to about 104° C. at which time 61 grams of an aqueous 50 weight percent solution was slowly admixed dropwise while maintaining the temperature of the reactants at about 104° C. Benzene-epichlorohydrin-water azeotropes distill off in the early stages of the reaction. As the reaction progressed a mixture of epichlorohydrin and water was azeotroped off. From each distillation cut collected, extraneous liquids (benzene-water or water) were separated from the epichlorohydrin and the epichlorohydrin was returned to the reaction flask. When approximately the stoichiometric amount of alkali had been added to the reaction mixture over a period of 1 hour, the reaction was terminated. Unreacted epichlorohydrin was distilled off under vacuum at a flask temperature of about 168° C. and an absolute pressure of 80 mm. 250 ml. of toluene were added to the residue. The salt formed during the reaction was filtered out and the toluene was distilled off at a temperature of about 165° C. and an absolute pressure of 55 mm. There was obtained 126.9 grams of epoxy resin product. The yield of epoxy resin from the slurry was 29.5 weight percent, based on the weight of the chloral initially used. The epoxy resin had an epoxy equivalent weight of 231.7 and a Gardner color of 11–12. The total yield of epoxy resin was 90.3 percent, based on the weight of the chloral initially used.

EXAMPLE IV

PART A

*Condensation of Chloralhydrate and Phenol*

82.7 grams (0.5 mole) of chloralhydrate, 95 grams (1 mole) phenol, 200 grams (2.5 moles) of benzene, and 4.3 grams of the acid catalyst as described in Example I, were combined in a 1-liter flask equipped with a means of stirring, a thermometer, a reflux condenser, and a water trap. The reaction mixture was heated at reflux to temperatures of from 82–89° C. in a nitrogen atmosphere for 7 hours while removing the water condensate.

Toward the end of the reaction or when practically all the water formed (approximately 18 cc.) in the reaction had been removed, a product crystallized from the benzene principally consisting of 4,4'-(2,2,2-trichloroethylidene) diphenol. The benzene portion was distilled off in sufficient quantity to leave a slurry containing catalyst, the crystalline 4,4'-(2,2,2-trichloroethylidene) diphenol, and the isomers 2,4'- and 2,2'-(2,2,2-trichloroethylidene) diphenol which remain in solution in benzene.

PART B

*Epoxylation of Chloralhydrate-Phenol Reaction Product*

460 grams (5 moles) of epichlorohydrin were added to the slurry of isomers prepared in Part A above with stirring. 7.5 grams of sodium hydroxide in 10 grams of water was added by means of a dropping funnel to the slurry. The reaction mixture was heated to about 104° C. at which time 83.2 grams (1.04 moles) of an aqueous 50 weight percent solution was slowly admixed dropwise while maintaining the temperature of the reactants at about 104° C. Benzene-epichlorohydrin-water azeotropes distill off in the early stages of the reaction. As the reaction progressed a mixture of epichlorohydrin and water was azeotroped off. From each distillation cut collected, extraneous liquids (benzene-water or water) were separated from the epichlorohydrin and the epichlorohydrin was returned to the reaction flask. When approximately the stoichiometric amount of alkali had been added to the reaction mixture over a period of 1 hour, the reaction was terminated. Unreacted epichlorohydrin was distilled off under vacuum at a flask temperature of about 168° C. and an absolute pressure of 80 mm. 250 ml. of toluene were added to the residue. The salt formed during the reaction was filtered out and the toluene was distilled off at a temperature of about 165° C. and an absolute pressure of 55 mm. There was obtained 201.7 grams of the epoxy resin product. The yield of epoxy resin was 93.6 weight percent, based on the weight of chloralhydrate or phenol initially used. The epoxy resin had an epoxy equivalent weight of 251.

EXAMPLE V

PART A

*Condensation of Chloral and Ortho-Cresol*

73.7 grams (0.5 mole) of chloral, 108 grams (1 mole) of ortho-cresol, 400 grams (5 moles) of benzene, and 4.3 grams of an acid catalyst, consisting of a mixture of 31.7 grams of dried diatomaceous earth impregnated with 163 grams of concentrated sulfuric acid, were combined in a 1-liter flask equipped with a means of stirring, a thermometer, a reflux condenser, and a water trap. The reaction mixture was heated at reflux temperatures of from 82–89° C. in a nitrogen atmosphere for 7 hours while removing the water.

Toward the end of the reaction or when practically all the water formed (approximately 9 cc.) in the reaction had been removed, a product crystallized from the benzene principally consisting of 4,4'-(2,2,2-trichloroethylidene) di-o-cresol. The benzene portion was distilled off in sufficient quantity to leave a slurry containing catalyst, 4,4'-(2,2,2-trichloroethylidene) di-o-cresol, and the isomers 2,4'-, and 2,2'-(2,2,2-trichloroethylidene) di-o-cresol which remain in solution in benzene.

PART B

*Epoxylation of Chloral-Ortho-Cresol Reaction Product*

462.5 grams (5 moles) of epichlorohydrin were added to the slurry of isomers prepared in Part A above with stirring. 7.5 grams of sodium hydroxide in 10 grams of water were added by means of a dropping funnel to the slurry. The reaction mixture was heated to about 104° C. at which time 89.4 grams of an aqueous 50 weight percent solution was slowly admixed dropwise while maintaining the temperature of the reactants at about 104° C. Benzene-epichlorohydrin-water azeotropes distill off in the early stages of the reaction. As the reaction progressed a mixture of epichlorohydrin and water was azeotroped off. From each distillation cut collected the extraneous liquids (benzene-water or water) were separated from the epichlorohydrin and the epichlorohydrin was returned to the reaction flask. When approximately the stoichiometric amount of alkali had been added to the reaction mixture over a period of 1 hour, the reaction was terminated. Unreacted epichlorohydrin was distilled off under vacuum at a flask temperature of about 168° C. and an absolute pressure of 80 mm. 250 ml. of acetone were added to the residue. The salt formed during the reaction was filtered out and the acetone was distilled off at a temperature of about 165° C. and an absolute pressure of 40 mm. There was obtained 218.3 grams of epoxy resin product, the diglycidyl ether of a mixture of 4,4'-, 2,4'-, and 2,2'-(2,2,2-trichloroethylidene) di-o-cresols. The yield of product was 95.4 percent by weight, based on the chloral initially used. The epoxy resin had an epoxy equivalent weight of 248. The theoretical epoxy equivalent weight is 228.7.

EXAMPLE VI

*Epoxylation of Chloral/o-Sec. Butyl Phenol Condensation Product*

Employing the procedure set forth under Parts A and B, Example IV, the following ingredients were reacted:

|  | Grams. |
| --- | --- |
| Chloral | 73.7 (0.5 mole). |
| o-sec. Butyl phenol | 150.2 (1 mole). |
| Benzene | 250. |
| Catalyst | 4.3. |
| Epichlorohydrin | 462.5 (5 mole). |
| NaOH (50 percent aqueous solution) | 89.4. |

The yield of epoxy resin product, the diglycidyl ether of a mixture of 4,4'-, 2,4'-, and 2,2'-(2,2,2-trichloroethylidene) bis(2-butylphenol), was 268.7 grams, or 98.8 percent by weight as based on the amount of choral used as the starting material. The resin had an epoxy equivalent weight of 318 as compared to 268.7, the theoretical epoxy equivalent weight.

The new epoxy resins of the invention are useful as potting, casting, and laminating resins. They can be hardened by known methods to form insoluble compounds with bifunctional or polyfunctional compounds such as alcohols, carboxylic acid anhydrides, phenols, isocyanates, amines, or aldehydes. If the hardened product has been prepared by adding cross-linking agents such as aliphatic amines or polyamines, it can be advantageously used as a casting resin suitable for electrical purposes or as a laminating resin. The clear light amber resins based on chloral are useful where fire resistance is desired.

It will thus be apparent that the new polyepoxy resin compositions are useful for a variety of purposes and therefore I claim:

1. An epoxy resin composition consisting of at least one isomer selected from the group consisting of the nuclear substituted 2,2,2-trichloro-1,1-bis(4,4'-[2,3-epoxypropoxy]phenyl)ethane, the nuclear substituted 2,2,2-trichloro-1,1-bis(2,2'-[2,3-epoxypropoxy]phenyl)ethane, and the nuclear substituted 2,2,2-trichloro-1,1-bis(2,4'-[2,3-epoxypropoxy]phenyl)ethane represented by the general formula:

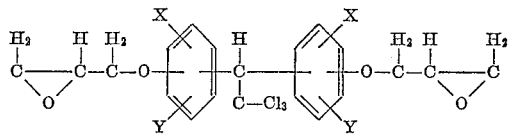

wherein X and Y, taken individually, are selected from the group of substituents consisting of hydrogen, $CH_3-$, $C_2H_5-$, $C_3H_7-$, and $C_4H_7-$ 2. A mixture of (1) the diglycidyl ether of 2,2'-(2,2,2-trichloroethylidene)diphenol and (2) the diglycidyl ether of 2,4'-(2,2,2-trichloroethylidene)diphenol.

3. A mixture of (1) the diglycidyl ether of 2,2'-(2,2,2-trichloroethylidene)di-o-cresol, (2) the diglycidyl ether of 2,4'-(2,2,2-trichloroethylidene)di-o-cresol, and (3) the diglycidyl ether of 4,4'-(2,2,2-trichloroethylidene)-di-o-cresol.

4. A mixture of (1) the diglycidyl ether of 2,2'-(2,2,2-trichloroethylidene)bis(2-butylphenol), (2) the diglycidyl ester of 2,4'-(2,2,2-trichloroethylidene)bis(2-butylphenol), and (3) the diglycidyl ether of 4,4'-(2,2,2-trichloroethylidene)bis(2-butylphenol).

5. The diglycidyl ether of 4,4'-(2,2,2-trichloroethylidene) diphenol.

References Cited in the file of this patent
UNITED STATES PATENTS

| 2,467,171 | Werner et al. | Apr. 12, 1949 |
| 2,506,486 | Bender et al. | May 2, 1950 |
| 2,572,141 | Harris | Oct. 23, 1951 |
| 2,637,676 | Mikeska | May 5, 1953 |